United States Patent
Apaydin et al.

(10) Patent No.: US 11,821,324 B2
(45) Date of Patent: Nov. 21, 2023

(54) DUCT FAILURE DETECTION IN A TURBINE ENGINE

(71) Applicant: General Electric Company, Schenectady, NY (US)

(72) Inventors: Mehmet Cem Apaydin, Istanbul (TR); Craig Alan Gonyou, Blanchester, OH (US); Scott Alan Schimmels, Miamisburg, OH (US); Christopher Michael Thompson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/845,213

(22) Filed: Jun. 21, 2022

(65) Prior Publication Data

US 2023/0340889 A1    Oct. 26, 2023

Related U.S. Application Data

(60) Provisional application No. 63/334,424, filed on Apr. 25, 2022.

(51) Int. Cl.
*F01D 21/00* (2006.01)
*F02C 3/04* (2006.01)
*G01M 15/14* (2006.01)

(52) U.S. Cl.
CPC .............. *F01D 21/003* (2013.01); *F02C 3/04* (2013.01); *G01M 15/14* (2013.01); *F05D 2270/3015* (2013.01)

(58) Field of Classification Search
CPC ........ F01D 21/003; F02C 3/04; G01M 15/14; F05D 2270/3015
See application file for complete search history.

(56) References Cited

U.S. PATENT DOCUMENTS

| | | | |
|---|---|---|---|
| 6,279,403 B1 * | 8/2001 | Gagnon | G01L 9/007 73/756 |
| 8,577,649 B2 | 11/2013 | Suyama et al. | |
| 8,696,196 B2 | 4/2014 | Monteiro | |
| 9,097,182 B2 | 8/2015 | Chillar et al. | |
| 10,196,928 B2 * | 2/2019 | Adibhatla | F02C 9/18 |
| 10,400,643 B2 | 9/2019 | Kashiwabara et al. | |
| 10,487,749 B2 * | 11/2019 | Bewick | G01M 3/2876 |
| 11,112,330 B2 | 9/2021 | Sahoo | |
| 2014/0309846 A1 * | 10/2014 | Howard | B64F 5/60 701/31.9 |
| 2017/0169632 A1 * | 6/2017 | Green | F02C 9/18 |
| 2017/0254216 A1 * | 9/2017 | Adibhatla | F02C 6/08 |

(Continued)

FOREIGN PATENT DOCUMENTS

FR    3097963 A1    1/2021

*Primary Examiner* — Jesse S Bogue
(74) *Attorney, Agent, or Firm* — Dority & Manning, P.A.

(57) ABSTRACT

A turbine engine includes a pressurized fluid source, a duct system comprising a plurality of ducts in fluid communication with the pressurized fluid source, and a duct failure detection system. The duct failure detection system includes a plurality of pressure sensors. Each of the plurality of pressure sensors is in operable communication with two ducts of the plurality of ducts. Each of the plurality of ducts has at least two pressure sensors of the plurality of pressure sensors in operable communication therewith.

17 Claims, 5 Drawing Sheets

(56) References Cited

U.S. PATENT DOCUMENTS

2020/0191680 A1    6/2020  Cipullo et al.
2022/0235715 A1*   7/2022  Rambo .................... F02C 9/26
2023/0036206 A1*   2/2023  Johnson ................. F01D 25/32

* cited by examiner

DUCT FAILURE DETECTION IN A TURBINE ENGINE

CROSS-REFERENCE TO RELATED APPLICATIONS

This application is a non-provisional application claiming the benefit of priority under 35 U.S.C. § 119(e) to U.S. Provisional Application No. 63/334,424, filed Apr. 25, 2022, which is hereby incorporated by reference in its entirety.

FIELD

The present disclosure relates to duct failure detection in a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. Gas turbine engines generally include pressurized pipes transporting fluid from one location to another for a variety of reasons.

BRIEF DESCRIPTION OF THE DRAWINGS

A full and enabling disclosure of the present disclosure, including the best mode thereof, directed to one of ordinary skill in the art, is set forth in the specification, which refers to the appended figures, in which.

DETAILED DESCRIPTION

The inventors of the present disclosure have found that improved detection of a break or rupture in one or more of these pressurized pipes would be beneficial in the art.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

To provide cooling, compressed air from a compressor section of a gas turbine engine may be routed via at least one compressor or bleed air extraction port to one or more cooling or bleed air circuits made up of various pipes or ducts and couplings. The ducts are configured to direct the compressed air to a desired section of the gas turbine engine. Engine requirements dictate that an engine should maintain operability with a broken duct present. To achieve this goal, duct systems must be overdesigned so that there is excess pressure and excess flow being used by the overall engine system in order to have sufficient flow and pressure under a failed duct condition. In current designs, each duct includes a dedicated independent sensor which is operably connected only to that particular duct to detect duct failure for that specific duct. In this configuration, a sensor failure may result in a false failed-duct alert.

The present disclosure is generally related to a duct failure detection system. In at least one embodiment, the system includes a plurality of pressure sensors such as but not limited to differential pressure sensors. Each pressure sensor is in operable communication with two or more ducts of a plurality of ducts. The duct failure detection system disclosed herein detects a duct failure against a supply pressure in the compressor or relative to a neighboring piping system, rather than indicating a burst duct based on feedback from a single sensor. The system disclosed herein provides redundancy in the duct failure detection system, thus eliminating a false duct failure alert that is based on feedback from a single sensor.

Figure 1:
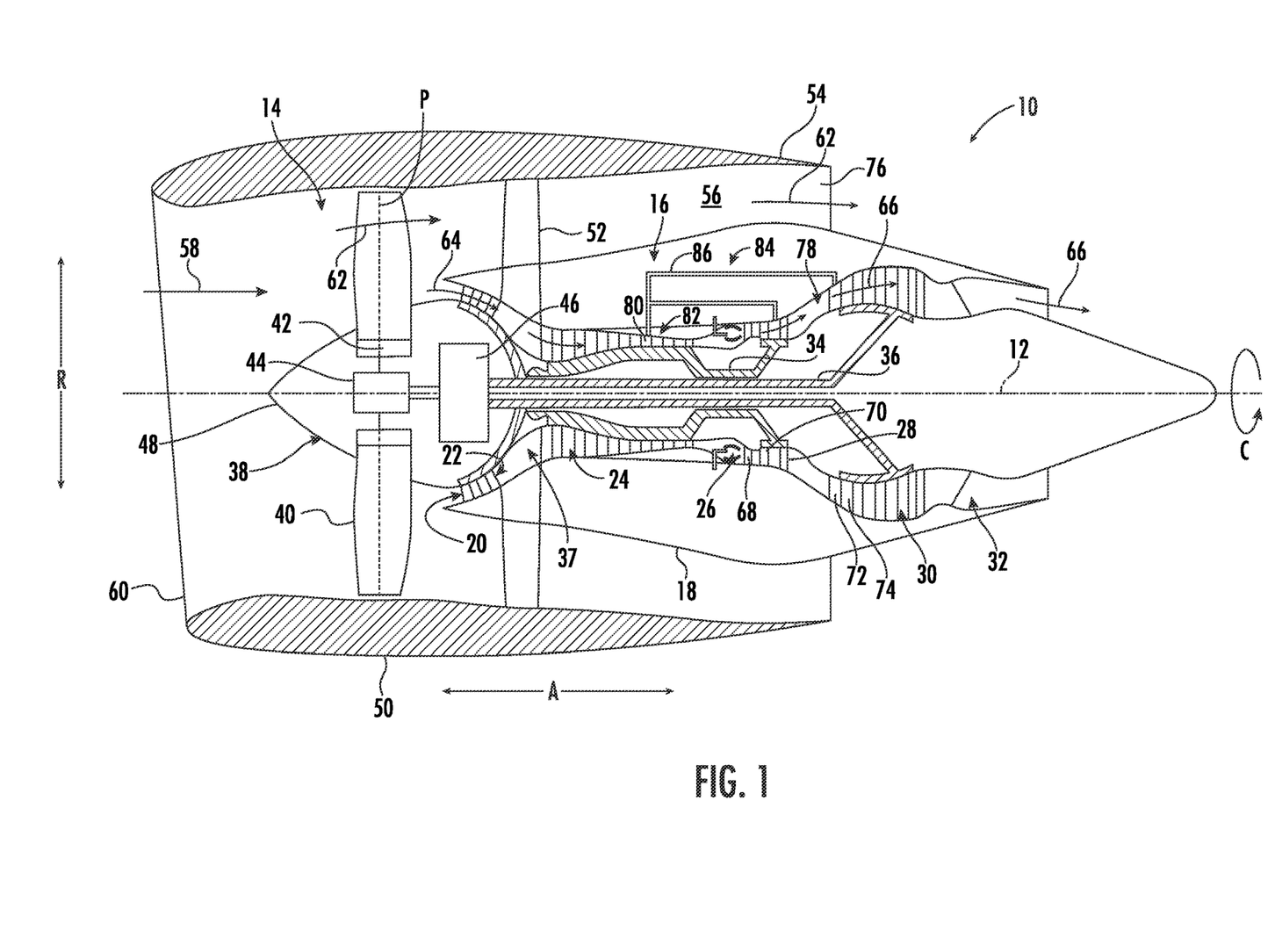
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes an engine cowl 18 that defines an annular core inlet 20. The engine cowl 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and a jet exhaust nozzle section 32. A high-pressure (HP) shaft 34 (which may additionally or alternatively be a spool) drivingly connects the HP turbine 28 to the HP compressor 24. A low-pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flow path 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by the LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially spaced outlet guide vanes 52 in the embodiment depicted. Moreover, a downstream section 54 of the nacelle 50 extends over an outer portion of the turbomachine 16 to define a bypass airflow passage 56 therebetween.

It should be appreciated, however, that the exemplary gas turbine engine 10 depicted in FIG. 1 is provided by way of example only, and that in other exemplary embodiments, the gas turbine engine 10 may have other configurations. For example, although the gas turbine engine 10 depicted is configured as a ducted gas turbine engine (i.e., including the outer nacelle 50), in other embodiments, the gas turbine engine 10 may be an unducted or non-ducted gas turbine engine (such that the fan 38 is an unducted fan, and the outlet guide vanes 52 are cantilevered from the engine cowl 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flow path 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to a turbine casing and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to a turbine casing and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

Figure 2:
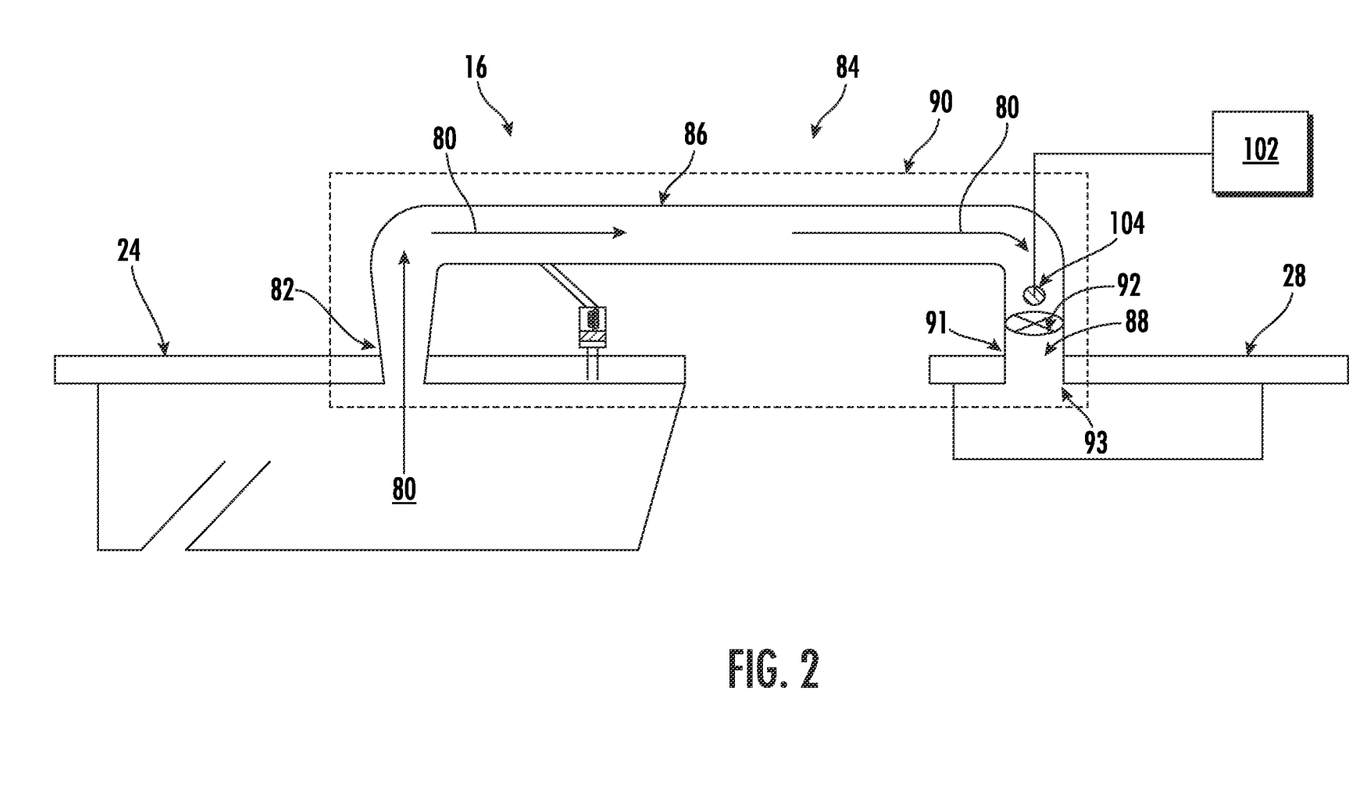
FIG. 2 is a schematic view of a portion of the turbomachine according to an exemplary embodiment of the present disclosure.

FIG. 2 is a schematic view of a portion of the turbomachine 16 of the gas turbine engine 10 of FIG. 1. As shown in FIGS. 1 and 2 collectively, cooling to various sections of the turbomachine 16 is provided via compressed air 80 that is extracted or bled from a pressurized fluid source, such as the high-pressure compressor 24. The turbomachine 16 includes one or more extraction ports 82 fluidly connected to the high-pressure compressor 24. In the exemplary embodiment, one or more of the extraction ports 82 may be positioned near an intermediate stage of the high-pressure compressor 24.

A duct system 84 is utilized to deliver the compressed air 80 to other sections of the turbomachine 16, such as but not limited to, the high-pressure turbine 28 to provide cooling to various hot gas path components and/or casing components. The duct system 84 includes a plurality of pipes or ducts 86 (only one duct 86 is shown in FIG. 2) to fluidly connect to a corresponding extraction port 82 to one or more inlet ports 88 of the high-pressure turbine 28. In a non-limiting embodiment, a series of fluidly coupled pipes, ducts, couplers, and the like that provide a flow path between a respective extraction port 82 and one or more inlet ports 88 may define a single or independent cooling circuit 90.

As shown in FIG. 2, a check valve 92, such as a pneumatic check valve, may be disposed within the duct 86. The check valve 92 allows the flow of compressed air 80 from the high-pressure compressor 24 with minimal pressure loss but restricts flow in the reverse direction, thus preventing hot gases from traveling back to the high-pressure compressor 24. The check valve 92 also minimizes overboard loss of cooling/pressurization/purge air in the event of a duct failure. In particular embodiments, the cooling circuit 90 does not include a check valve 92.

Figure 3:
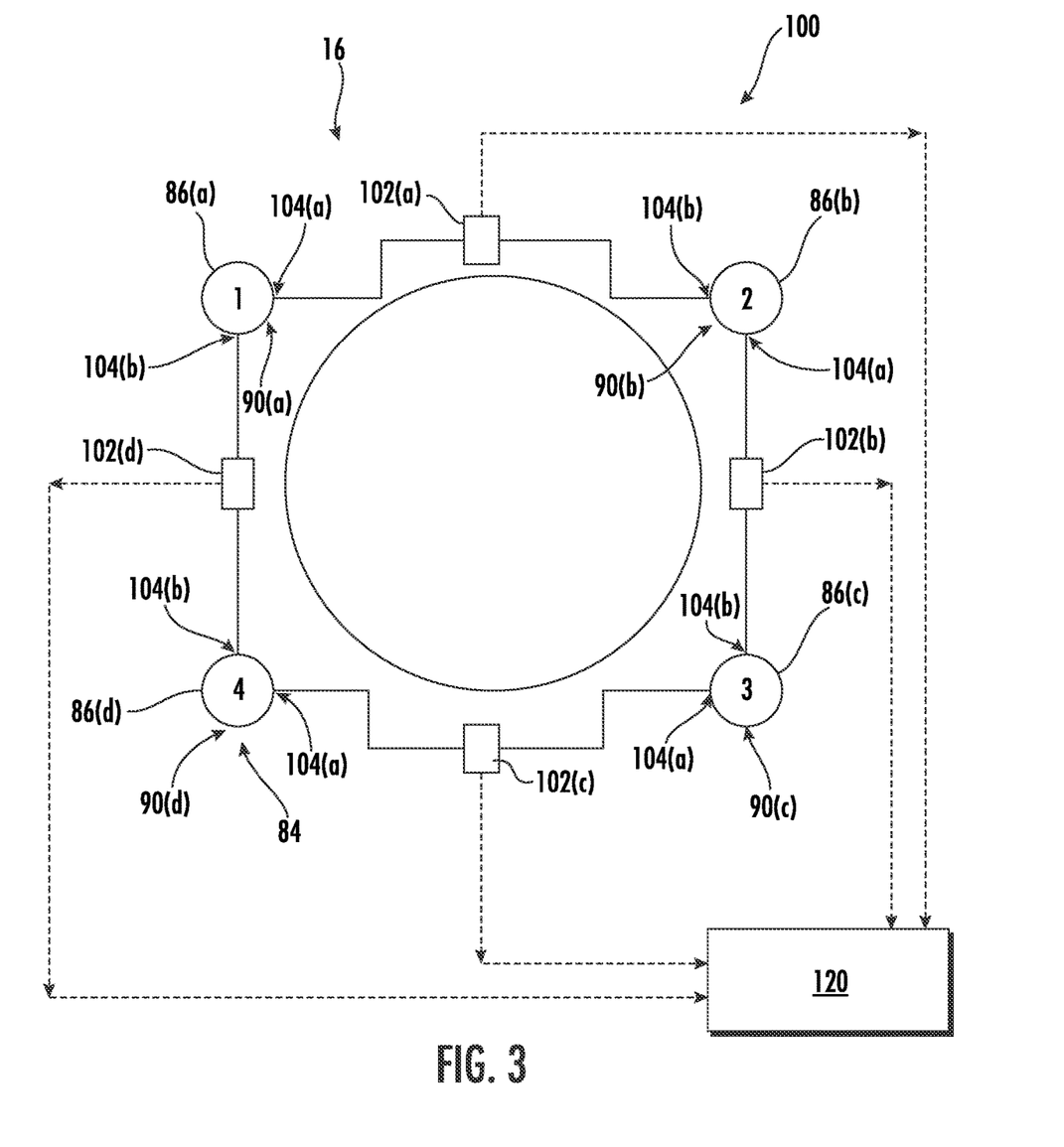
FIG. 3 provides a schematic view of an aft end of the turbomachine according to an exemplary embodiment of the present disclosure.

FIG. 3 provides a schematic view of an aft end of the turbomachine 16 of the gas turbine engine 10 of FIG. 1, according to an exemplary embodiment of the present disclosure. As shown in FIG. 3, the duct system 84 includes multiple cooling circuits 90. Referring back to FIG. 2 illustrating a single cooling circuit 90 and corresponding duct 86, each cooling circuit 90 has a furthest downstream end 91 that is defined proximate to a final/last flow outlet 93 of the corresponding cooling circuit 90.

As shown in FIG. 3, the turbomachine 16 includes a duct failure detection system 100 or system 100. The system 100 includes at least one pressure sensor or sensor 102 such as but not limited to a differential pressure sensor or transducer that is in operable communication with a duct 86 of two neighboring cooling circuits 90. In this manner, the pressure sensor 102 is in operable communication with two ducts 86.

In particular embodiments, the system 100 includes $N_D$ number of ducts 86, and $N_S$ number of sensors 102. In some embodiments, the number of ducts $N_D$ is equal to the number of sensors $N_S$. For instance, for the depicted embodiment of FIG. 3, the system 100 includes four ducts 86(a), 86(b), 86(c), and 86(d) and four sensors 102(a), 102(b), 102(c), and 102(d).

As shown in FIGS. 2 and 3 collectively, each sensor 102 is operably connected to two ducts 86 of two neighboring cooling circuits 90 via corresponding pressure taps 104 that are located upstream from and proximate to a corresponding check valve 92 positioned within each duct. Each duct 86 includes at least two corresponding pressure taps 104(a) and 104(b). In the exemplary embodiment, the pressure taps 104 and the check valve 92 are positioned at a furthest downstream end of a corresponding cooling circuit 90, closest to the corresponding inlet port 88. This positioning allows for detection of a duct failure at any point along a particular cooling circuit 90 upstream from the corresponding pressure tap 104. As shown in FIG. 3, each duct 86 includes at least two pressure taps 104(a) and 104(b).

As shown in FIG. 3, each sensor 102 is operably connected to two ducts 86 of two neighboring cooling circuits 90 via corresponding pressure taps 104(a) and 104(b). For example, sensor 102(a) is operably connected to ducts 86(a) and 86(b) of neighboring cooling circuits 90(a) and 90(b) via corresponding pressure taps 104(a) and 104(b). Sensor 102(b) is operably connected to ducts 86(b) and 86(c) of neighboring cooling circuits 90(b) and 90(c) via corresponding pressure taps 104(a) and 104(b). Sensor 102(c) is operably connected to ducts 86(c) and 86(d) of neighboring cooling circuits 90(c) and 90(d) via corresponding pressure taps 104(a) and 104(b). Sensor 102(d) is operably connected to ducts 86(d) and 86(a) of neighboring cooling circuits 90(d) and 90(a) via corresponding pressure taps 104(a) and 104(b).

In an exemplary embodiment wherein the sensor 102 is a pressure differential sensor, each sensor 102 is connected to two ducts of two cooling circuits via pressure taps. The sensors 102 are designed such that each has a piston that is forced in one direction or the opposite depending on the pressure from a corresponding cooling circuit duct pushing on the actuating piston. The piston may have a spring or set of springs to hold in a nominal position, and when the pressure delta across the piston exceeds a certain value, the piston will bottom out against a set of contacts. This in turn closes continuity across a circuit. When the pistons of two pressure differential sensors operably coupled to the ducts 86 of two cooling circuits bottom out against their respective set of contacts, a failed condition or duct failure is indicated. When the piston of only one of the two pressure differential sensors operably connected to the same ducts 86 bottoms out against its respective set of contacts, that may be an indication of a faulty sensor, and not a burst duct. The value of the pressure delta may be set to allow for nominal leaks to occur from the ducts without indicating a duct failure.

The sensors 102(a), 102(b), 102(c), and 102(d) are each communicatively coupled with an engine controller 120 of the gas turbine engine 10, e.g., via one or more wire or wireless communication links. In this regard, sensor data can be routed from the sensors 102(a), 102(b), 102(c), and 102(d) to the engine controller 120.

In an exemplary embodiment, sensors 102(a), 102(b), 102(c), and 102(d) read pressure differences or differential pressures between their corresponding neighboring cooling circuits 90(a), 90(b), 90(c), and 90(d). The pressure differentials can be routed to the engine controller 120, e.g., for processing. Once the read differential pressures between two cooling circuits operably connected to two sensors exceeds a predetermined value, the system will indicate a failed duct. For instance, one or more processors of the engine controller 120 can receive first data from sensor 102(a) indicating a differential pressure between duct 86(a) of cooling circuit 90(a) and duct 86(b) of cooling circuit 90(b), second data from sensor 102(b) indicating a differential pressure between duct 86(b) of cooling circuit 90(b) and duct 86(c) of cooling circuit 90(c), third data from sensor 102(c) indicating a differential pressure between duct 86(c) of cooling circuit 90(c) and duct 86(d) of cooling circuit 90(d), and fourth data from sensor 102(d) indicating a differential pressure between duct 86(d) of cooling circuit 90(d) and duct 86(a) of cooling circuit 90(a).

In some instances, the differential pressures received by the one or more processors of the engine controller 120 can indicate a duct failure. It is to be noted that the system 100 only requires two sensor differential pressure signals received at the engine controller 120 to indicate a duct failure. In the case of a burst or duct failure, two out of the four sensors 102(a), 102(b), 102(c), and 102(d) will respond to confirm the duct failure.

The engine controller 120 is configured to determine a duct failure associated with a duct such as for example the duct 86(a) in response to the first data from the sensor 102(a) and the second data from the sensor 102(d) both indicating a duct failure. In other words, two sensors operably coupled to the same duct 86 must sense and provide data indicative of a duct failure for the duct failure detection system to indicate a duct failure. If a single sensor, such as the sensor 102(a), provided a signal indicative of a failed duct without the sensor 102(b) or 102(d) providing a similar indication, it is contemplated that the duct failure detection system may ignore the signal from the sensor 102(a) or otherwise determine that that the sensor 102(a) is a failed sensor.

In this manner, the system 100 effectively distinguishes a burst or otherwise failed duct event from a broken or failed sensor event. Upon the determination that a duct failure has occurred, the one or more processors of the engine controller 120 can then generate and communicate an alert that indicates that a duct failure has occurred. The alert can be communicated, e.g., to a pilot or aircrew, to maintenance or service personnel, to the operator of the gas turbine engine 10, etc.

In addition, the system 100 disclosed herein may provide the capability to verify not only the burst duct event but also which duct 86 to inspect for repair. As one example, where sensors 102(a) and sensor 102(d) both indicate positive signals, duct 86(a) may be flagged as a duct to inspect for repair, namely because sensor 102(a) and sensor 102(d) both have pressure taps 104(a), 104(b) operably connected with duct 86(a). As another example, where sensors 102(b) and sensor 102(c) both indicate positive signals, duct 86(c) may be flagged as a duct to inspect for repair, namely because sensor 102(b) and sensor 102(c) both have pressure taps 104(a), 104(b) operably connected with duct 86(c). Accordingly, the alert generated by the one or more processors of the engine controller 120 can indicate the specific duct in need of inspection or repair.

Figure 4:
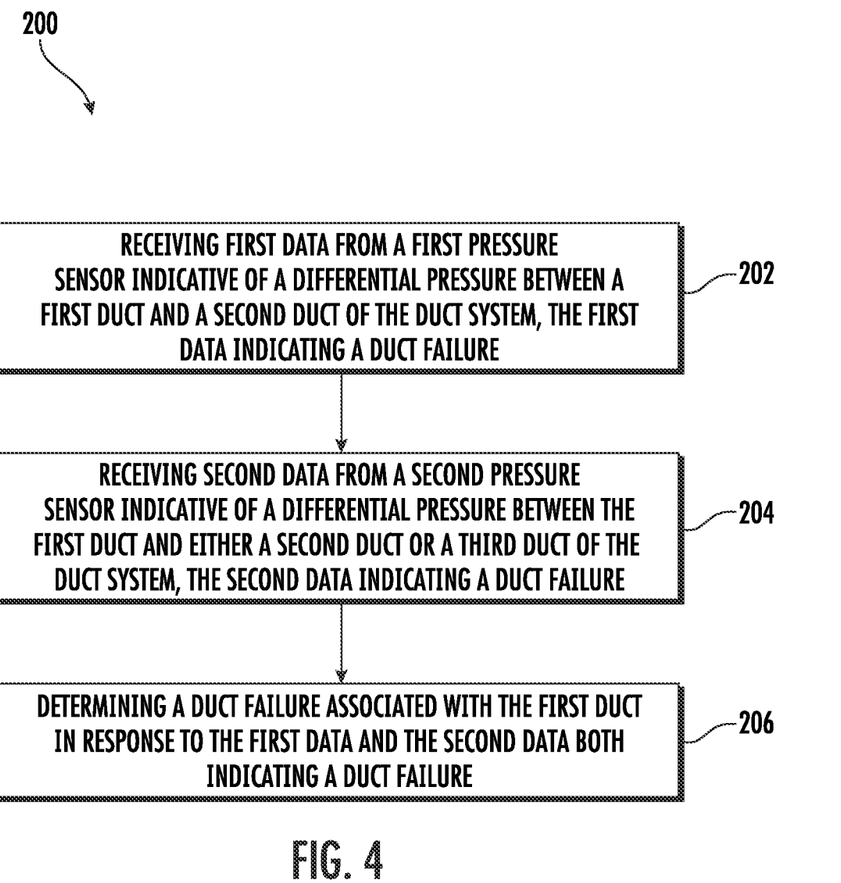
FIG. 4 provides a flowchart diagram for a method of detecting a duct failure of a duct system according to an example embodiment of the present disclosure.

FIG. 4 provides a flowchart diagram for a method 200 of detecting a duct failure of a duct system, such as a duct system that is in fluid communication with a pressurized fluid source of a turbine engine as disclosed herein. The method 200 includes at step 202, receiving first data from a first pressure sensor indicative of a differential pressure between a first duct and a second duct of the duct system, wherein the differential pressure indicates a duct failure. At step 204, the method 200 includes receiving second data from a second pressure sensor indicative of a differential pressure between the first duct and either the second duct or a third duct of the duct system, wherein the differential pressure between the first duct and either the second duct or the third duct indicates a duct failure. At step 206, the method 200 includes determining a duct failure in response to receiving the first data and the second data, or rather in response to both the first pressure sensor indicating a duct failure and the second pressure sensor indicating a duct failure.

In some implementations, the second data from the second pressure sensor indicates the differential pressure between the first duct and the third duct of the duct system. In other implementations, the second data from the second pressure sensor indicates the differential pressure between the first duct and the second duct of the duct system.

In some further implementations, the turbine engine includes a compressor section and a turbine section, and wherein the first duct, the second duct, and the third duct extend from the compressor section to the turbine section. In other implementations, the first duct, the second duct, and the third duct each extend between an upstream end and a downstream end, and wherein each pressure sensor is in operable communication with their respective ducts proximate the downstream ends of the respective ducts. Further, in yet other implementations, the method 200 further includes communicating an alert indicating the duct failure associated with the first duct. The alert can be a general alert indicating that a duct failure has occurred or can specifically indicate that the first duct has failed.

Figure 5:
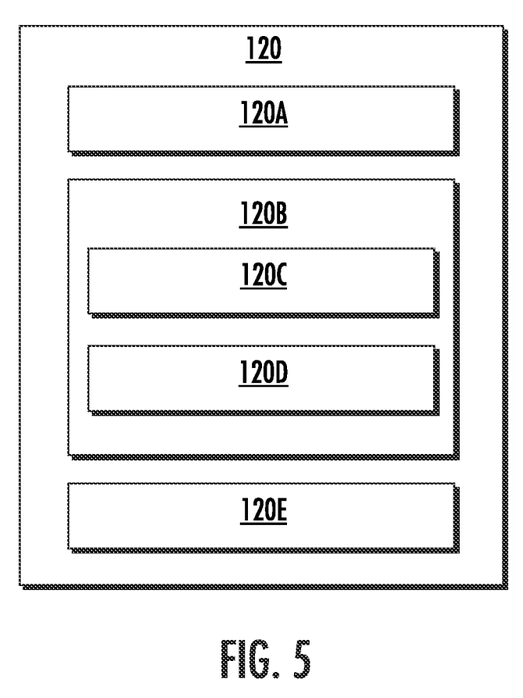
FIG. 5 provides a system diagram of an engine controller of the gas turbine engine of FIG. 1 according to example embodiments of the present disclosure.

FIG. 5 provides a system diagram of the engine controller 120. As shown, the engine controller 120 can include one or more processor(s) 120A and one or more memory device(s) 120B. The one or more processor(s) 120A can include any processing device, such as a microprocessor, microcontroller, integrated circuit, logic device, and/or other suitable processing device. The one or more memory device(s) 120B can include one or more computer-readable media, including, but not limited to, non-transitory computer readable medium, RAM, ROM, hard drives, flash drives, and/or other memory devices.

The one or more memory device(s) 120B can store information accessible by the one or more processor(s) 120A, including computer-executable or computer-readable instructions 120C that can be executed by the one or more processor(s) 120A. The instructions 120C can be any set of instructions that when executed by the one or more processor(s) 120A, cause the one or more processor(s) 120A to perform operations, such as operations for determining a duct failure. The instructions 120C can be software written in any programming language or can be implemented in hardware or firmware. Additionally, and/or alternatively, the instructions 120C can be executed in logically and/or virtually separate threads on processor(s) 120A. The memory device(s) 120B can further store data 120D that can be accessed by the processor(s) 120A.

The engine controller 120 can also include a network interface 120E used to communicate, for example, with the other components of the system 100 (e.g., via a network). The network interface 120E can include components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine comprising a pressurized fluid source, a duct system comprising a plurality of ducts in fluid communication with the pressurized fluid source, and a duct failure detection system. The duct failure detection system comprising a plurality of pressure sensors. Each of the plurality of pressure sensors is in operable communication with two ducts of the plurality of ducts. Each of the plurality of ducts has at least two pressure sensors of the plurality of pressure sensors in operable communication therewith.

The turbine engine of any preceding clause, wherein the plurality of ducts includes $N_D$ number of ducts, and wherein the plurality of pressure sensors includes $N_S$ number of pressure sensors, and wherein $N_D$ is equal to $N_S$.

The turbine engine of any preceding clause, wherein each duct of the plurality of ducts extends between an upstream end and a downstream end of the respective duct, wherein each of the pressure sensors is in operable communication with the two ducts of the plurality of ducts proximate downstream ends of the two ducts of the plurality of ducts.

The turbine engine of any preceding clause, wherein each pressure sensor of the plurality of pressure sensors is a spring-loaded differential pressure sensor.

The turbine engine of any preceding clause, wherein the pressurized fluid source is a compressor section of the turbine engine.

The turbine engine of any preceding clause, wherein the turbine engine further comprises a turbine section, and wherein the two ducts of the plurality of ducts extend from the compressor section to the turbine section.

The turbine engine of any preceding clause, wherein at least one duct of the plurality of ducts is in fluid communication with at least one airfoil within the turbine section.

The turbine engine of any preceding clause, wherein the two ducts of the plurality of ducts define a first duct and a second duct operably connected to a first pressure sensor of the plurality of sensors, wherein the first duct is from a first cooling circuit and the second duct is from a second cooling circuit.

The turbine engine of any preceding clause, wherein the two ducts of the plurality of ducts define a first duct and a second duct, and the plurality of ducts further includes a third duct, wherein the plurality of pressure sensors comprises a first pressure sensor and a second pressure sensor, wherein the first pressure sensor is in operable communication with the first duct and the second duct, and wherein the second pressure sensor is in operable communication with the first duct and the third duct.

The turbine engine of any preceding clause, further comprising an engine controller. The engine controller configured to receive, from the first pressure sensor, first data indicative of a differential pressure between the first duct and the second duct, the first data indicating a duct failure. The engine controller further configured to receive, from the second pressure sensor, second data indicative of a differential pressure between the first duct and either the second duct or the third duct, the second data indicating a duct failure, and in response to the first data and the second data both indicating a duct failure, determine a duct failure associated with the first duct.

The turbine engine of any preceding clause, wherein the second data received from the second pressure sensor is indicative of the differential pressure between the first duct and the third duct of the duct system.

The turbine engine of any preceding clause, wherein the plurality of pressure sensors further comprises a third pressure sensor, wherein the third pressure sensor is in operable communication with the second duct and the third duct, and wherein the third pressure sensor is in operable communication with the second duct and the third duct.

The turbine engine of any preceding clause, further comprising an engine controller configured to receive, from the first pressure sensor, first data indicative of a differential pressure between the first duct and the second duct, the first data indicating a duct failure, receive, from the second pressure sensor, second data indicative of no differential pressure between the first duct and either the second duct or the third duct, the second data not indicating a duct failure, and in response to the first data indicating a duct failure and the second data not indicating a duct failure, determine a pressure sensor failure associated with the first pressure sensor.

The turbine engine of any preceding clause, wherein the first duct includes a first pressure tap and the second duct includes a second pressure tap, wherein the first pressure sensor is in operable communication with the first duct via the first pressure tap and with the second duct via the second pressure tap.

A method of detecting a duct failure of a duct system in fluid communication with a pressurized fluid source of a turbine engine, the method comprising receiving first data from a first pressure sensor indicative of a differential pressure between a first duct and a second duct of the duct system, the first data indicating a duct failure. The method further comprising receiving second data from a second pressure sensor indicative of a differential pressure between the first duct and either the second duct or a third duct of the duct system, the second data indicating a duct failure, and determining a duct failure associated with the first duct in response to the first data and the second data both indicating a duct failure.

The method of detecting a duct failure of a duct system in fluid communication with a pressurized fluid source of a turbine engine of any preceding clause, wherein receiving the second data from the second pressure sensor comprises receiving the second data from the second pressure sensor indicative of the differential pressure between the first duct and the third duct of the duct system.

The method of detecting a duct failure of a duct system in fluid communication with a pressurized fluid source of a turbine engine of any preceding clause, wherein receiving the second data from the second pressure sensor comprises receiving the second data from the second pressure sensor indicative of the differential pressure between the first duct and the second duct of the duct system.

The method of detecting a duct failure of a duct system in fluid communication with a pressurized fluid source of a turbine engine of any preceding clause, wherein the turbine engine comprises a compressor section and a turbine section, and wherein the first duct, the second duct, and the third duct extend from the compressor section to the turbine section.

The method of detecting a duct failure of a duct system in fluid communication with a pressurized fluid source of a turbine engine of any preceding clause, wherein the first duct, the second duct, and the third duct each extend between an upstream end and a downstream end, and wherein each pressure sensor is in operable communication with their respective ducts proximate downstream ends of the respective ducts.

The method of detecting a duct failure of a duct system in fluid communication with a pressurized fluid source of a turbine engine of any preceding clause, further comprising communicating an alert indicating the duct failure associated with the first duct.

A non-transitory computer readable medium comprising computer-executable instructions, which, when executed by one or more processors of an engine controller associated with a turbine engine, cause the one or more processors of the engine controller to receive, from a first pressure sensor, first data indicative of a differential pressure between a first duct and a second duct of a duct system of the turbine engine, the first data indicating a duct failure, receive, from a second pressure sensor, second data indicative of a differential pressure between the first duct and either the second duct or a third duct of the duct system, the second data indicating a duct failure, and in response to the first data and the second data both indicating a duct failure, determine a duct failure associated with the first duct.

The non-transitory computer readable medium comprising computer-executable instructions of any preceding clause, wherein the second data received from the second pressure sensor is indicative of the differential pressure between the first duct and the third duct of the duct system.

The non-transitory computer readable medium comprising computer-executable instructions of any preceding clause, wherein the second data received from the second pressure sensor is indicative of the differential pressure between the first duct and the second duct of the duct system.

The non-transitory computer readable medium comprising computer-executable instructions of any preceding clause, wherein the first duct, the second duct, and the third duct are in fluid communication with a compressor of the turbine engine.

We claim:

1. A turbine engine comprising:
   a pressurized fluid source;
   a duct system comprising a plurality of ducts in fluid communication with the pressurized fluid source, wherein the plurality of ducts incudes a first duct, a second duct, and a third duct; and
   a duct failure detection system comprising a plurality of pressure sensors, each of the plurality of pressure sensors in operable communication with two ducts of the plurality of ducts, each of the plurality of ducts having at least two pressure sensors of the plurality of pressure sensors in operable communication therewith,
   wherein the plurality of pressure sensors includes a first pressure sensor, a second pressure sensor, and a third pressure sensor, wherein the first pressure sensor is in operable communication with the first duct and the second duct, wherein the second pressure sensor is in operable communication with the first duct and the third duct, wherein the third pressure sensor is in operable communication with the second duct and the third duct, and wherein the third pressure sensor is in operable communication with the second duct and the third duct.

2. The turbine engine of claim 1, wherein the plurality of ducts includes $N_D$ number of ducts, and wherein the plurality of pressure sensors includes $N_S$ number of pressure sensors, and wherein $N_D$ is equal to $N_S$.

3. The turbine engine of claim 1, wherein each duct of the plurality of ducts extends between an upstream end and a downstream end of the respective duct, wherein each of the pressure sensors of the plurality of pressure sensors is in operable communication with the two ducts of the plurality of ducts proximate downstream ends of the two ducts of the plurality of ducts.

4. The turbine engine of claim 1, wherein each pressure sensor of the plurality of pressure sensors is a spring-loaded differential pressure sensor.

5. The turbine engine of claim 1, wherein the pressurized fluid source is a compressor section of the turbine engine.

6. The turbine engine of claim 5, wherein the turbine engine further comprises a turbine section, and wherein each ducts of the plurality of ducts extend from the compressor section to the turbine section.

7. The turbine engine of claim 6, wherein at least one duct of the plurality of ducts is in fluid communication with at least one airfoil within the turbine section.

8. The turbine engine of claim 1, wherein the first duct and the second duct are operably connected to the first pressure sensor of the plurality of sensors, wherein the first duct is fluidly coupled to a first cooling circuit and the second duct is fluidly coupled to a second cooling circuit.

9. The turbine engine of claim 1, wherein the first duct includes a first pressure tap and the second duct includes a second pressure tap, wherein the first pressure sensor is in operable communication with the first duct via the first pressure tap and with the second duct via the second pressure tap.

10. The turbine engine of claim 1, further comprising:
    an engine controller configured to:
       receive, from the first pressure sensor, first data indicative of a differential pressure between the first duct and the second duct, the first data indicating a duct failure;
       receive, from the second pressure sensor, second data indicative of a differential pressure between the first duct and either the second duct or the third duct, the second data indicating a duct failure; and
       in response to the first data and the second data both indicating a duct failure, determine a duct failure associated with the first duct.

11. The turbine engine of claim 10, wherein the second data received from the second pressure sensor is indicative of the differential pressure between the first duct and the third duct of the duct system.

12. The turbine engine of claim 1, further comprising:
    an engine controller configured to:
       receive, from the first pressure sensor, first data indicative of a differential pressure between the first duct and the second duct, the first data indicating a duct failure;
       receive, from the second pressure sensor, second data indicative of no differential pressure between the first duct and either the second duct or the third duct, the second data not indicating a duct failure; and
       in response to the first data indicating a duct failure and the second data not indicating a duct failure, determine a pressure sensor failure associated with the first pressure sensor.

13. A method of detecting a duct failure of a duct system in fluid communication with a pressurized fluid source of a turbine engine, the method comprising:
    receiving first data from a first pressure sensor indicative of a differential pressure between a first duct and a second duct of the duct system, the first data indicating a duct failure;
    receiving second data from a second pressure sensor indicative of a differential pressure between the first duct and either the second duct or a third duct of the duct system, the second data indicating a duct failure;
    determining a duct failure associated with the first duct in response to the first data and the second data both indicating a duct failure, wherein receiving the second data from the second pressure sensor comprises receiving the second data from the second pressure sensor indicative of the differential pressure between the first duct and the third duct of the duct system.

14. The method of claim 13, wherein receiving the second data from the second pressure sensor comprises receiving the second data from the second pressure sensor indicative of the differential pressure between the first duct and the second duct of the duct system.

15. The method of claim 13, wherein the turbine engine comprises a compressor section and a turbine section, and wherein the first duct, the second duct, and the third duct extend from the compressor section to the turbine section.

16. The method of claim 13, wherein the first duct, the second duct, and the third duct each extend between an upstream end and a downstream end, and wherein each pressure sensor is in operable communication with their respective ducts proximate downstream ends of the respective ducts.

17. The method of claim 13, further comprising:
    communicating an alert indicating the duct failure associated with the first duct.

* * * * *